US009683439B2

(12) United States Patent
Rodney

(10) Patent No.: US 9,683,439 B2
(45) Date of Patent: Jun. 20, 2017

(54) SAFETY CABLE FOR DOWNHOLE COMMUNICATIONS

(71) Applicant: Halliburton Energy Services, Inc., Houston, TX (US)

(72) Inventor: Paul F. Rodney, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/906,833

(22) PCT Filed: Oct. 29, 2013

(86) PCT No.: PCT/US2013/067220
§ 371 (c)(1),
(2) Date: Jan. 21, 2016

(87) PCT Pub. No.: WO2015/065331
PCT Pub. Date: May 7, 2015

(65) Prior Publication Data
US 2016/0168981 A1 Jun. 16, 2016

(51) Int. Cl.
*G01V 3/00* (2006.01)
*E21B 47/12* (2012.01)
*H01B 7/00* (2006.01)
*H01B 7/04* (2006.01)
*H01B 11/18* (2006.01)

(52) U.S. Cl.
CPC ........... *E21B 47/12* (2013.01); *H01B 7/0054* (2013.01); *H01B 7/046* (2013.01); *H01B 11/18* (2013.01); *H01B 11/1895* (2013.01)

(58) Field of Classification Search
CPC ..... E21B 47/12; H01B 11/18; H01B 11/1895; H01B 7/0054; H01B 7/046
USPC ........................................................ 340/854.9
See application file for complete search history.

(56) References Cited

U.S. PATENT DOCUMENTS 4,301,428 A 11/1981 Mayer
4,486,721 A 12/1984 Cornelius et al.
5,132,490 A * 7/1992 Aldissi ............... H01B 11/1066 174/106 SC
6,342,677 B1 1/2002 Lee
(Continued)

FOREIGN PATENT DOCUMENTS

CN 2067451 U 12/1990
CN 2181733 Y 11/1994
(Continued)

OTHER PUBLICATIONS

Texas Instruments, "AN-1511 Cable Discharge Event," Application Report SNLA087A, Jul. 2006 [Revised Apr. 2013].*
(Continued)

*Primary Examiner* — Nader Bolourchi
(74) *Attorney, Agent, or Firm* — John W. Wustenberg; Baker Botts L.L.P.

(57) ABSTRACT

An example system for transmitting signals may include a signal source, a signal target, and a transmission cable coupled to the signal source and the signal target. The transmission cable may include a first conductor and a second conductor surrounding the first conductor. A resistive layer may be between the first conductor and the second conductor and allow current flow between the first conductor and the second conductor.

19 Claims, 6 Drawing Sheets

(56) References Cited

U.S. PATENT DOCUMENTS

| | | | |
|---|---|---|---|
| 6,596,943 B1 | 7/2003 | Ward | |
| 2002/0046867 A1 | 4/2002 | Leijon et al. | |
| 2003/0184309 A1 | 10/2003 | Lurtz | |
| 2010/0096161 A1 | 4/2010 | Dalrymple et al. | |
| 2010/0211230 A1* | 8/2010 | Bulliard ............ | H01J 37/32045 700/293 |
| 2010/0231228 A1 | 9/2010 | Koelblin et al. | |

FOREIGN PATENT DOCUMENTS

| | | | |
|---|---|---|---|
| CN | 2252384 | Y | 4/1997 |
| CN | 2666077 | Y | 12/2004 |
| CN | 2699441 | Y | 5/2005 |
| CN | 2807416 | Y | 8/2006 |
| CN | 2824244 | Y | 10/2006 |
| CN | 200976295 | Y | 11/2007 |
| CN | 201112005 | Y | 9/2008 |
| CN | 201126740 | Y | 10/2008 |
| CN | 201270159 | Y | 7/2009 |
| CN | 201345241 | Y | 11/2009 |
| CN | 201413649 | Y | 2/2010 |
| CN | 201430024 | Y | 3/2010 |
| CN | 201440343 | U | 4/2010 |
| CN | 201477986 | U | 5/2010 |
| CN | 101783203 | A | 7/2010 |
| CN | 101789286 | A | 7/2010 |
| CN | 201570310 | U | 9/2010 |
| CN | 201673726 | U | 12/2010 |
| CN | 101996705 | A | 3/2011 |
| CN | 101996710 | A | 3/2011 |
| CN | 201758026 | U | 3/2011 |
| CN | 201918211 | U | 8/2011 |
| CN | 201946361 | U | 8/2011 |
| CN | 202034116 | U | 11/2011 |
| CN | 202142326 | U | 2/2012 |
| FR | 1475665 | A | 4/1967 |
| GB | 239521 | A | 6/1926 |
| JP | 60090235 | A | 5/1985 |
| JP | 05120930 | A | 5/1993 |
| RU | 67763 | U1 | 10/2007 |
| RU | 91464 | U1 | 2/2010 |
| RU | 2417470 | C1 | 4/2011 |
| RU | 113413 | U1 | 2/2012 |
| UA | 8296 | U | 7/2005 |
| UA | 8297 | U | 7/2007 |

OTHER PUBLICATIONS

International Preliminary Report on Patentability issued in related Application No. PCT/US2013/067220, mailed May 12, 2016 (9 pages).

International Search Report and Written Opinion issued in related PCT Application No. PCT/US2013/067220, mailed Jul. 24, 2014 (7 pages).

Eaton et al., “Electrical Losses in Coaxial Cable”, Proceedings of the 57th International Wire & Cable Symposium, pp. 515-520 (5 pages).

“Teledyne Storm Cable: Application-specific, bulk cable”, downloaded from internet at: http://www.teledyneoilandgas.com/about/productlines/cablesolutions/storm.htm, on Feb. 1, 2016 (5 pages).

Chedid et al., “Electromagnetic Coupling to a Wearable Application Based on Coaxial Cable Architecture”, Progress in Electromagnetics Research, PIER 56, 109-128, 2006 (20 pages).

* cited by examiner

SAFETY CABLE FOR DOWNHOLE COMMUNICATIONS

CROSS-REFERENCE TO RELATED APPLICATION

The present application is a U.S. National Stage Application of International Application No. PCT/US2013/067220 filed Oct. 29, 2013, which is incorporated herein by reference in its entirety for all purposes.

BACKGROUND

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore or borehole at a desired well site, treating the borehole to optimize production of hydrocarbons, and performing the necessary steps to produce and process the hydrocarbons from the subterranean formation. Certain operations may require an exchange of information between elements on the surface of the formation and elements located thousands of feet below the surface. These information exchanges typically occur via one of an electromagnetic telemetry system, a mud pulse telemetry system, or a wired drill pipe.

FIGURES

Some specific exemplary embodiments of the disclosure may be understood by referring, in part, to the following description and the accompanying drawings.

Figure 4A:
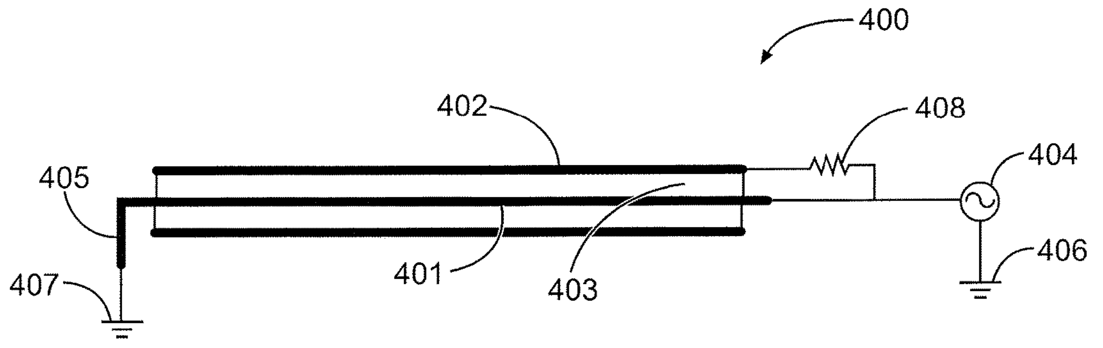
Figure 4B:
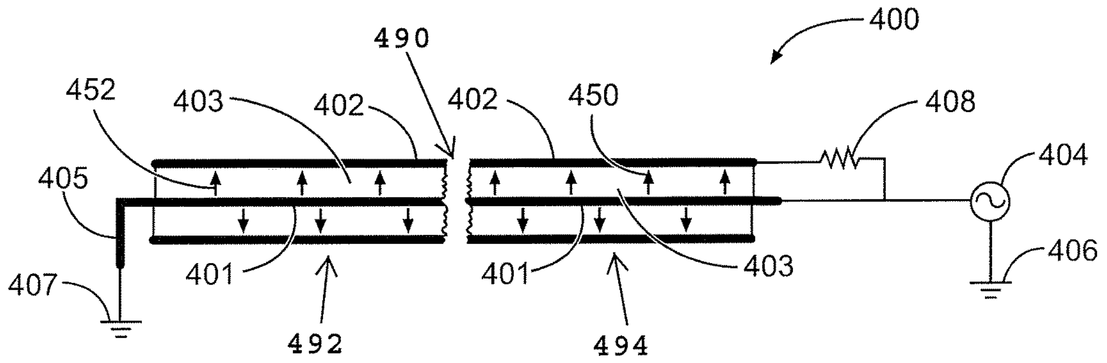

FIG. 4A-B are diagrams of an example transmission cable, according to aspects of the present disclosure.

Figure 5:
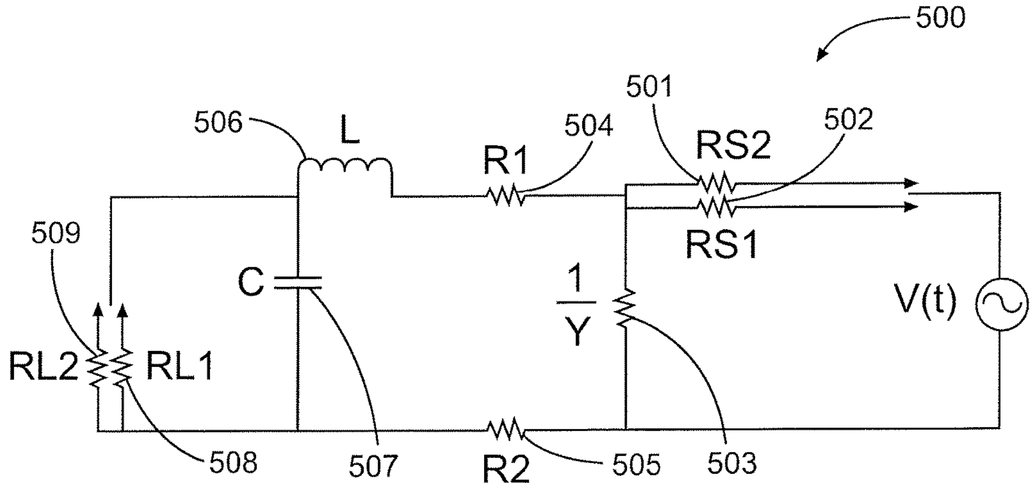

FIG. 5 is an electrical model of the example transmission cable shown, according to aspects of the present disclosure.

Figure 6A:
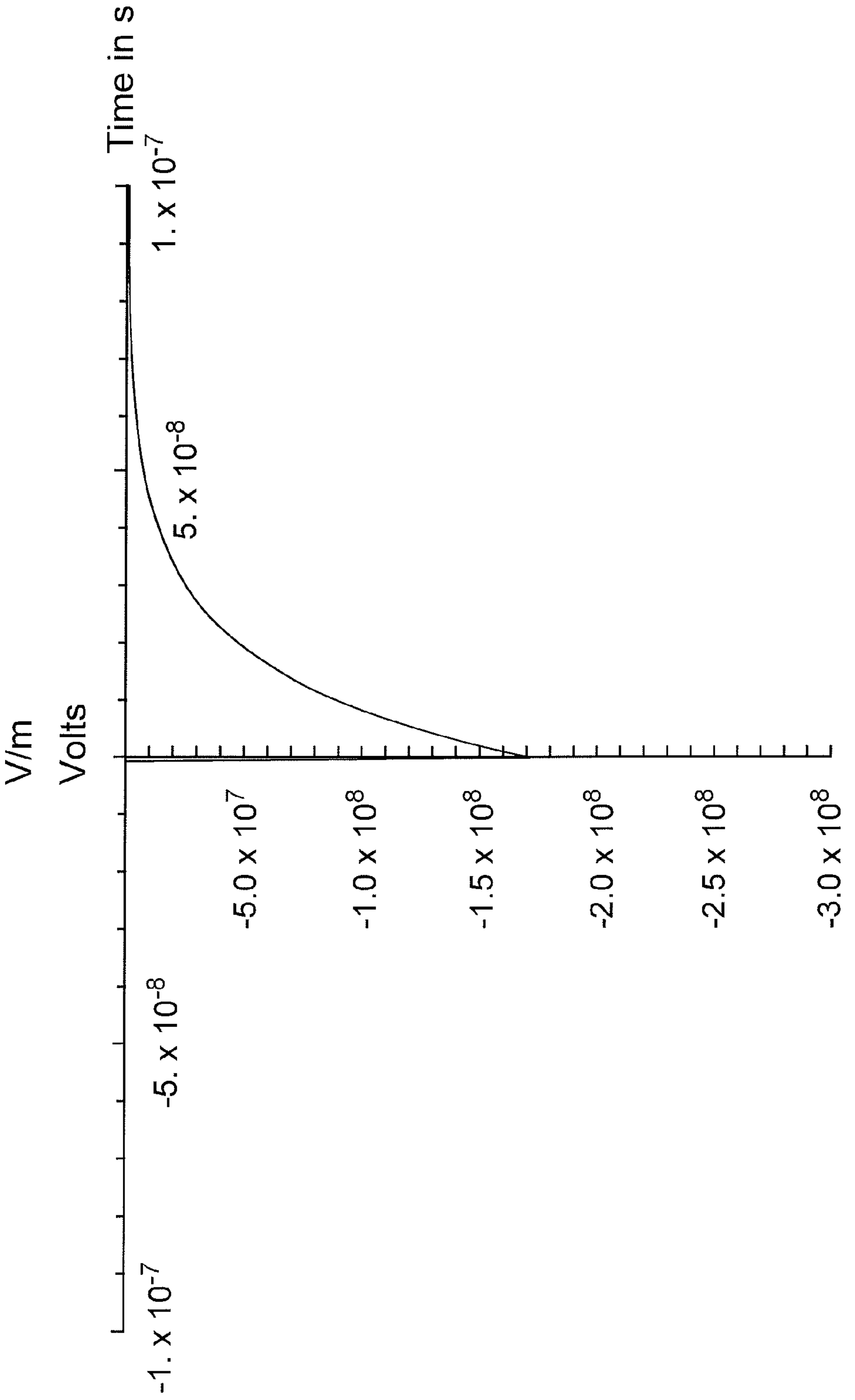
Figure 6B:
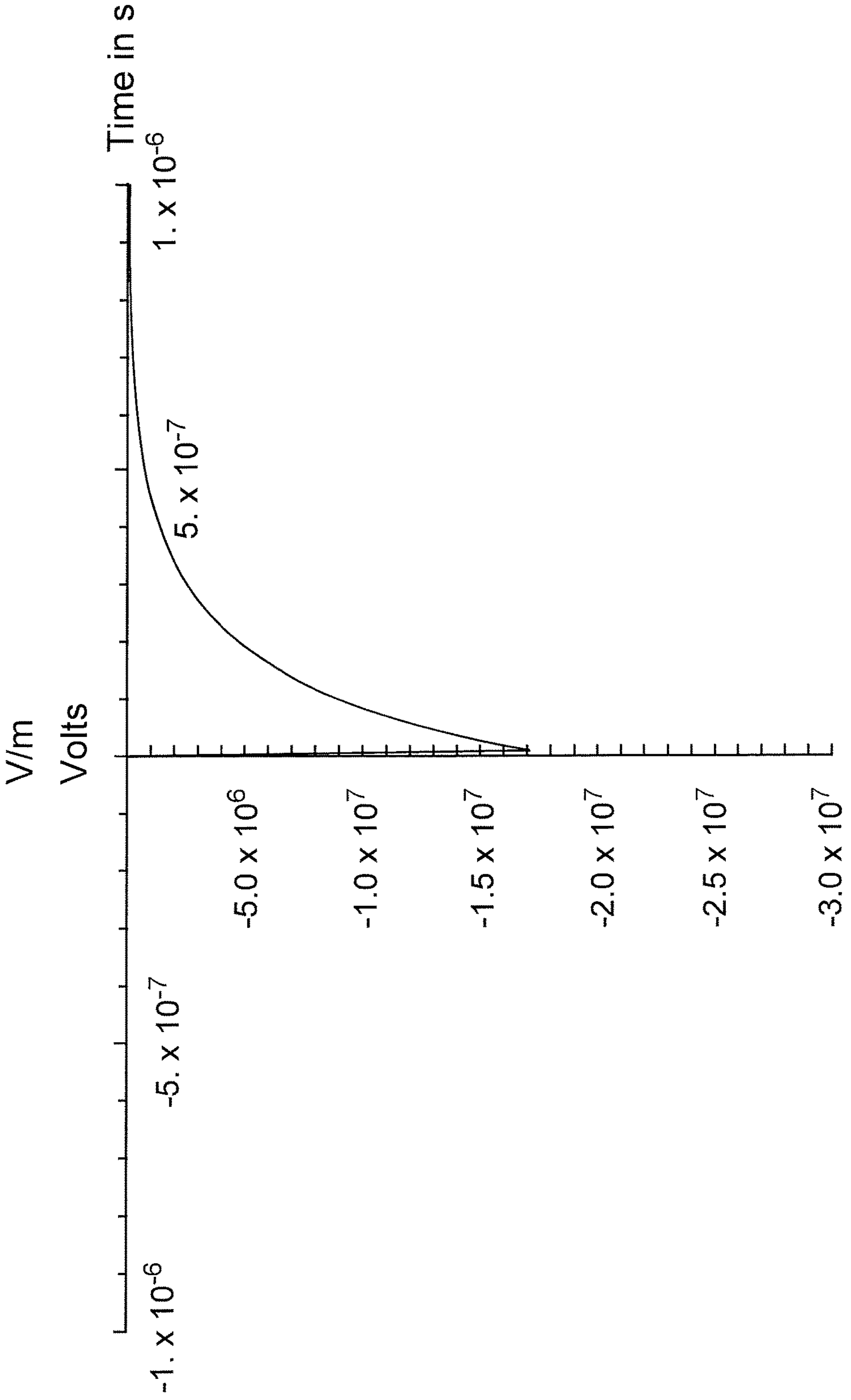
Figure 6C:
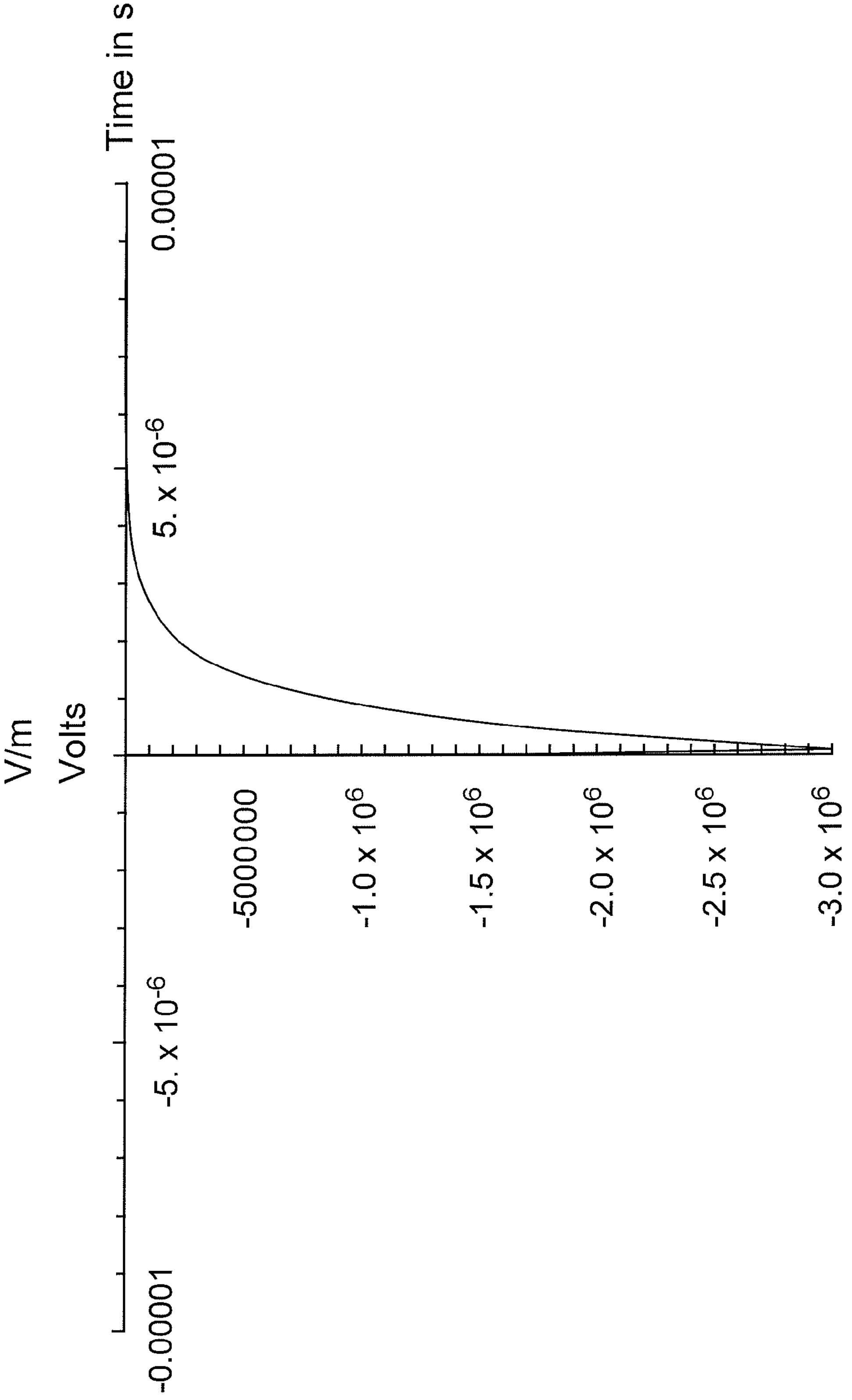

FIGS. 6A-C are charts of maximum field strengths for example transmission cables, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear boreholes in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Modern petroleum drilling and production operations demand information relating to parameters and conditions downhole. Several methods exist for downhole information collection, including logging-while-drilling ("LWD") and measurement-while-drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

Figure 1:
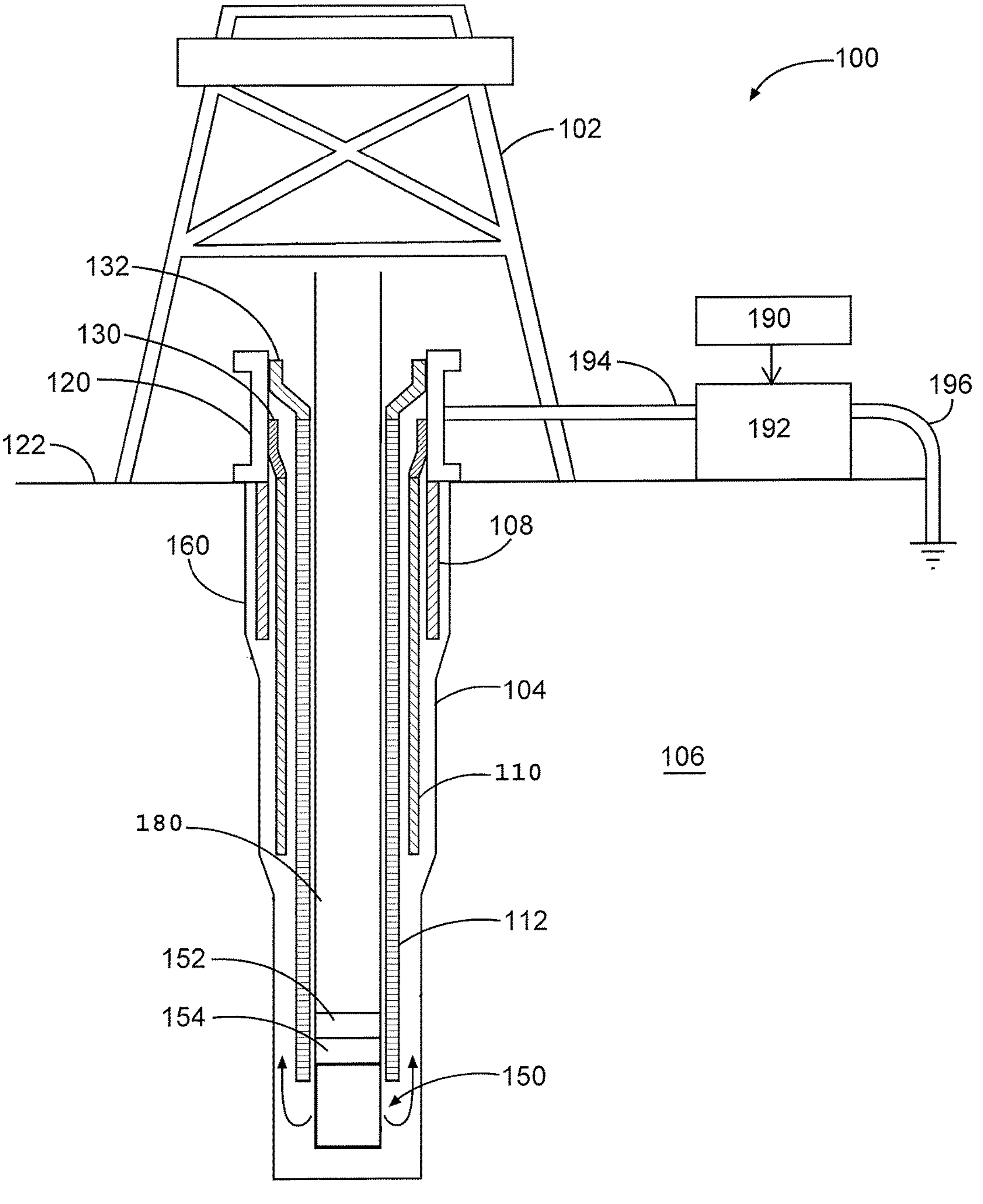
FIG. 1 is a diagram of an example drilling system, according to aspects of the present disclosure.

FIG. 1 is a diagram of an example drilling system 100, according to aspects of the present disclosure. The system 100 may include a rig 102 mounted at the surface 122, positioned above a borehole 104 within a subterranean formation 106. Although the surface 122 is shown as land in FIG. 1, the drilling rig of some embodiments may be located at sea, in which case the surface 122 may comprise a drilling platform, and the borehole 104 may be located in the sea floor, separated from the drilling platform by a volume of water.

The system 100 may comprise one or more tubular elements 108, 110, and 112 at least partially disposed within the borehole 104. The tubulars may have different diameters and lengths, and may be arranged concentrically, or approximately concentrically, within the borehole 104. Tubular 108 may be cemented into the borehole 104 proximate the surface 112, and may be coupled to a wellhead 120 positioned at the surface 122 through a welded joint or through bolts, for example. Tubular 110 may be least partially within an internal bore of the tubular 108, coupled to the wellhead 120 through a casing hanger 130, and secured within the formation 106, borehole 104, and tubular 108 using a cement layer. Likewise, tubular 112 may be at least partially within an internal bore of the tubular 108 and an internal bore of the tubular 110, coupled to the wellhead 120 through a casing hanger 132, and secured within the formation 106, borehole 104, and tubular 108, and tubular 110 using a cement layer. As would be appreciated by one of ordinary skill in the art in view of this disclosure, different tubular configurations are possible, including, but not limited to, configurations with more or less tubulars; tubulars with different lengths, diameters, and positioning; and different attachment mechanisms between the tubulars and the wellhead.

The system 100 includes a downhole tool 150 positioned within the borehole 104, coupled to a pipe string 180 that extends to the surface 122. The downhole tool 150 may comprise at least one telemetry system 152 through which the downhole tool 150 is communicably coupled to a control unit 190 located at the surface 122. In certain embodiments, the downhole tool 150 may receive control signals from the control unit 190. The control signals may be directed to one or more elements 154 of the downhole tool 150 that are actuatable or otherwise controllable by the control unit 190. Depending on the configuration of and purpose for the downhole tool 150, the elements 154 may comprise downhole motors, valves, pumps, sensors, controllers, etc. For example, the downhole tool 150 may comprise a portion of a drilling assembly, such as a bottom-hole-assembly (BHA) that is coupled to a drill bit. The BHA may include multiple sensors and controllers that take measurements of the borehole 104 and the formation 106 surrounding the borehole 104 in a LWD/MWD application. In other embodiments, the downhole tool 150 may comprise a cementing tool through which cement is pumped downhole to secure the tubulars 108-112. The cementing tool may include multiple valves and pumps that direct cement slurry into the borehole 104. Although only two types of downhole tools are described above, others are possible within the scope of this disclosure, as are different configurations for BHAs and cementing tools.

The control unit 190 may comprise an information handling system that generates signals to the downhole tool 150. The control unit 190 may contain information such as surveys of the formation 106, downhole measurements, and models of the formation 106 and borehole 104, and may generate control signals to the downhole tool 150 based, at least in part, on that information. In certain embodiments, the control unit 190 may automatically generate control signals based on algorithms within the control unit 190. In certain embodiments, the control unit 190 may receive an input from a user, and generate a control signal based, at least in part, on the input from the user.

In an exemplary embodiment, the drilling system 100 may further comprise a signal transmitter 192 communicably coupled to the control unit 190. The signal transmitter 192 may be electrically coupled to the wellhead 120 via a transmission cable 194 and grounded to the formation 106 through cable 196. In certain embodiments, the signal transmitter 192 may include its own power source, or be connected to a stand-alone power source (not shown). The signal transmitter 192 may receive a control signal from the control unit 190 and, using internal circuitry, transmit that control signal to the downhole tool 150.

In certain embodiments, the signal transmitter 192 may transmit the control signal by driving time-varying current or voltage waveforms onto the wellhead 120 through the transmission cable 194. The time-varying current or voltage waveforms may then be transmitted to at least one of the tubulars 108-112 through the wellhead 120. When the time-varying current or voltage waveforms reach one of the tubulars 108-112, a similar time-varying electromagnetic (EM) field may be generated around the tubulars 108-112, permeating the borehole 104 and formation 106. In certain embodiments, the telemetry system 152 may comprise an antenna to receive the generated EM field. The telemetry system 152 may determine the control signal from the control unit 190 by identifying amplitude spikes and/or frequency or phase changes in the generated EM field.

In certain embodiments, high levels of current, on the order of tens of amperes, may be needed at the wellhead 120 and tubulars 108-112 to generate an EM field strong enough to reach the telemetry system 152. Accordingly, large amounts of current and/or voltage must be transmitted to the wellhead 120 and tubulars 108-112 through the transmission cable 194. This exposes workers at the surface to a risk of electrocution if the transmission cable 194 breaks. To limit the amount of electrical discharge from the broken transmission cable 194, the signal transmitter 192 may include circuitry to remove power from the transmission cable 194 as soon as a problem is detected. The protection circuitry, however, does not address the residual energy stored within the transmission cable 194 due to built-in inductance and capacitance, which can be significant depending on the length of the transmission cable.

Figure 2:
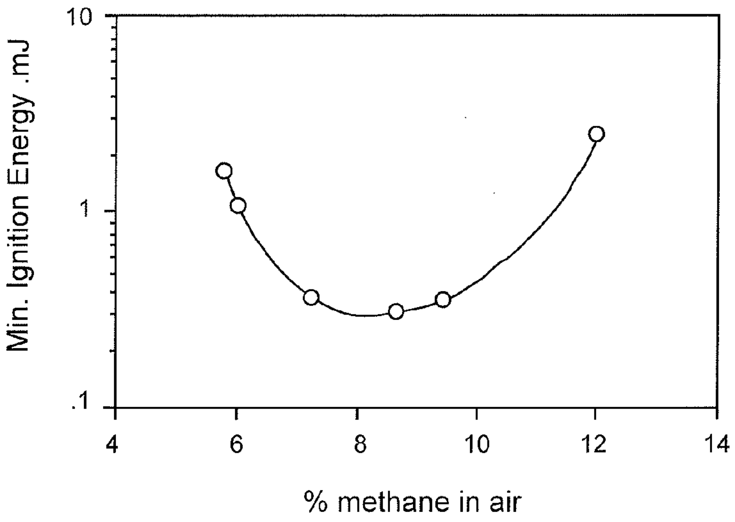
FIG. 2 is a chart of the minimum ignition energy for an air/methane mixture.

In addition to a risk of electrocution, a discharge of the residual energy risks igniting flammable gasses present around the rig 102. One example gas is methane, which may escape from the formation 106 during drilling and mix with the air surrounding the rig 102. When the transmission cable 194 breaks, the residual energy may form an electric field around the point at which the transmission cable is broken or severed (the "break point"). A spark may form at the break point if the strength of the electric field exceeds a breakdown field strength of the air/methane mixture, typically $3\times10^6$ Volts per meter (V/m), characterized as the point at which an applied electric field overcomes the insulating properties of the air/methane mixture and electrical conduction occurs. Once formed, the spark may ignite the methane if the energy associated with the spark exceeds a minimum ignition energy for the methane. FIG. 2 is a chart showing the minimum ignition energy for an air/methane mixture. As can be seen, the minimum ignition energy depends on the concentration of methane in air, with the lowest minimum ignition energy being around 0.3 millijoules (mJ) when the methane is at an 8.5% concentration. Although methane is described above, other flammable gasses can be found around drilling rigs, each of which may have different breakdown field strengths and minimum ignition energies.

According to aspects of the present disclosure, a "safety" transmission cable that dissipates residual energy when broken may be used to transmit a signal to the wellhead 120. By dissipating the residual energy, the safety transmission cable may prevent ignition of flammable gasses by reducing the strength of the electric field at the break point below the necessary breakdown field strength to prevent sparks from forming or by reducing the residual energy to a level below the necessary minimum ignition energy. Although exemplary safety transmission cables are described herein with respect to a drilling system and a wellhead, transmission cables incorporating aspects of the present disclosure may be used to transmit energy and signals to other systems, and are not limited to the drilling operations.

Figure 3:
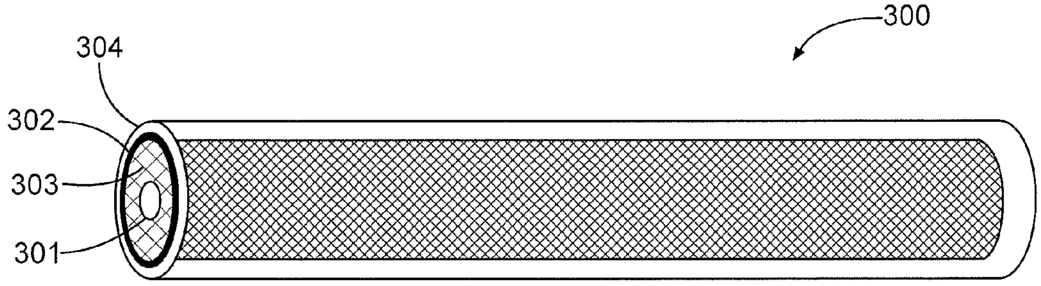
FIG. 3 is a diagram of an example transmission cable, according to aspects of the present disclosure.

FIG. 3 is a diagram of an example transmission cable, according to aspects of the present disclosure. The transmission cable 300 may comprise a first conductor 301 and a second conductor 302. The first conductor 301 and second conductor 302 may consist of a highly conductive material, typically metal. A resistive layer 303 may be positioned between the first conductor 301 and the second conductor 302. As used herein, a layer may be resistive if it has a bulk resistivity value of between about 10 kiloohm meters and 1 Ohm meter. This is distinct from an insulative material whose bulk resistivity value may be many orders of magnitude higher, such as glass with a resistivity value of approximately $10^{10}$ to $10^{14}$ Ohm meters. In the present embodiment, the resistive layer 303 may comprise a material with a moderate bulk resistivity value, typically on the order of between about 1000 Ohm meters and 1 Ohm meter, that can be calculated based on the length and power transmission applications for the cable 300, as will be described below. In certain embodiments, the resistive layer 303 may comprise one or more layers of one or more different materials that combined have a moderate bulk resistivity value. Example materials include conductive rubbers, silicon compounds, or conductive polymers. In certain embodiments, an insulative protective layer 304 may be adjacent to second conductor 302, on an opposite side from the resistive layer 303.

In the embodiment shown, the transmission cable 300 comprises a coaxial cable, and the first conductor 301 comprises a central conductor of the coaxial cable. The resistive layer 303 may surround the first conductor 301, and the second conductor 303 may surround the resistive layer 303. The second conductor 302 may be surrounded by the protective layer 304, forming a protective jacket around the transmission cable 300. The insulative protective layer 304 may comprise an insulative material that increases the durability of the transmission cable 300.

FIGS. 4A and 4B are electrical diagrams of an example transmission cable 400, according to aspects of the present disclosure. In the embodiment shown, the transmission cable 400 comprises a coaxial cable with a first conductor 401 arranged centrally, surrounded by a resistive layer 403 and a second conductor 402. The transmission cable 400, and in particular the first conductor 401, may be coupled between a signal source 404 and a signal target 405. In certain embodiments, the signal source 404 may comprise a signal transmitter and the signal target 405 may comprise a wellhead, similar to those described with respect to FIG. 1. Both the signal source 404 and the signal target 405 may be coupled to ground potentials 406 and 407, respectively.

As can be seen in FIG. 4A, when the transmission cable 400 is intact (i.e., not broken), the first conductor 401 may function as a primary signal carrier between the signal source 404 and the signal target 405, carrying most of the current between the two. The resistive layer 403 may allow some current to pass from the first conductor 401 to the second conductor 402 when the first conductor 401 is carrying the signal, but the current loss may be small compared to the current strength within the first conductor 401, due to the conductivity of the resistive layer 403 being much less than the conductivity of the first conductor 401. Some current may also flow through a resistor 408 coupling the first conductor 401 to the second conductor 402.

FIG. 4B shows the transmission cable 400 broken at a break point 490. When the transmission cable 400 is broken, the signal source 404 may immediately cease driving current into the portion 492 of the first conductor 401 coupled to the signal target 405 and may cease driving current into the portion 494 of the first conductor 401 coupled to the signal source 404, after some short time interval. Residual energy may exist within both portions 492 and 494 of the cable 400 due to the self-inductance and the internal capacitance of the cable 400. Most or all of the residual energy in portions 492 and 494 may flow as current through the resistive layer 403 from the first conductor 401 to the second conductor 402, rather than out of the first conductor 401 into the air surrounding the break point 490. Current within the portion 492 is shown by arrows 452, and current within portion 494 is shown by arrows 450. This is in contrast to a cable with an insulative layer between the first conductor 401 and the second conductor 402, or to a cable without a second conductor 402, in which current primarily travels out of the first conductor 401 and into the air, where it can cause a spark. The resistance of the resistive layer 403 will cause a voltage to be generated across the resistive layer 403, dissipating the residual energy as heat in the resistive layer 403. Due to the dissipation, any residual energy that is released from the break point 490 is either not sufficient to surpass the breakdown field strength of the air surrounding the break point 490 or not sufficient to surpass the minimum ignition energy of the flammable gas.

According to aspects of the present disclosure, the resistivity value for a resistive layer required to dissipate the energy and/or to prevent the formation of a spark may be determined using a lumped element representation of the safety transmission cable. FIG. 5 is an electrical model 500 of the example transmission cable shown in FIG. 4, according to aspects of the present disclosure. Although only one model 500 is described herein, different models and configurations of models may be used within the scope of this disclosure, as would be appreciated by one of ordinary skill in the art in view of this disclosure.

In the model 500, V(t) represents a signal source, resistor 501 with impedance RS1 represents the impedance of the signal source prior to when the cable breaks, and resistor 502 with impedance RS2 represents the impedance of the signal source after the cable breaks. Resistor 503 with resistance 1/Y represents the resistive layer, with Y corresponding to the shunt conductance of the resistive layer. Resistor 504 with resistance R1 and resistor 505 with resistance R2 represent the series resistance of the first conductor and the second conductor, respectively. Inductor 506 with inductance L represents the self-inductance of the transmission cable, and capacitor 507 with capacitance C represents the capacitance of the transmission cable. Resistor 508 with impedance RL1 represents the impedance of the signal target prior to when the cable breaks, and resistor 509 with impedance RL2 represents the impedance of the signal target after the cable breaks. Notably, the values of RL1/RL2 and RS1/RS2 can be set to correspond to where along the transmission cable the break point occurs. Additionally, R1, R2, L, and C may be calculated from known material parameters, corresponding to the length of the cable.

Example simulations were run using the above model to determine a conductivity value for the resistive layer sufficient to dissipate residual energy and prevent a spark from forming. For the simulations, the transmission cable was assumed to have a construction similar to an RG-14U coaxial cable, with the insulator replaced by a conductive layer with a moderate resistivity value, similar to the resistive layers described above. The following values were used to determine the model parameters:

first conductor resistance/unit length=0.003277 Ohms per meter;

second conductor resistance/unit length=0.003277 Ohms per meter;

capacitance per unit length=96.8 picofarads per meter;

inductance per unit length=2.62 microhenries per meter;

first conductor diameter=2.588 millimeters;

inner diameter of second conductor=9.398 millimeters;

cable length=30 meters; and source voltage=10 volts.

Based on the above, at least 12.5 millijoules of residual energy would be stored in the cable upon breakage, above the minimum ignition energy from methane mixed with air.

Simulations were run to determine field strengths at break points for cables with the above common values but with different values for the conductance of the resistive layer. FIG. 6A-C are charts showing the maximum field strengths in V/m versus times in seconds for the different cables, according to aspects of the present disclosure. FIG. 6A corresponds to a cable in which the shunt conductivity per unit length of the resistive layer is 0.0001 mhos per meter. FIG. 6B corresponds to a cable in which the shunt conductivity per unit length of the resistive layer in 0.001 mhos per meter. FIG. 6C corresponds to a cable in which the shunt conductivity per unit length of the resistive layer in 0.005 mhos per meter. As can be seen, the absolute value of the maximum electrical field in FIG. 6A is approximately $1.7*10^8$ V/m, almost two orders of magnitude above the breakdown field strength for air, meaning a spark will occur at the break point. Likewise, the absolute value of the maximum electrical field in FIG. 6B is approximately $1.6*10^7$ V/m, also above the breakdown field strength for air. The absolute value of the maximum electrical field in FIG. 6C, in contrast, is $3*10^6$ V/m, approximately the same as the breakdown field strength, meaning that resistive layers with shunt conductivities per unit length at or above 0.005 mhos per meter will dissipate sufficient residual energy to prevent sparks from forming. As would be appreciated by one of ordinary skill in the art in view of this disclosure, the particular conductivity/resistivity values and ranges may change depending on the configuration of the transmission cable as well as the amount of current the cable is designed to carry.

Safety transmission cables as described herein may be used in other drilling applications in addition to driving current onto a well head. For example, safety transmission cables may be used in wireline applications, where a safety transmission cable is attached directly to a downhole tool that is positioned within the borehole. In such embodiments, the safety transmission cable may transmit signals directly to the downhole tool, instead of indirectly through the generation of an EM field in the borehole/formation. The signal source may comprise a control unit positioned at the surface, and the signal target may comprise a wireline LWD/MWD tool positioned in the borehole. Other general power/data transmission applications are also possible, as would be appreciated by one of ordinary skill in view of this disclosure.

According to aspects of the present disclosure, an example transmission cable may comprise a first conductor and a second conductor surrounding the first conductor. A resistive layer may be between the first conductor and the second conductor and allow current to flow between the first conductor and the second conductor. In certain embodiments, the first conductor, second conductor, and resistive layer may be arranged coaxially. The resistive layer may comprise at least one of a conductive rubber, a silicon compound, and a conductive polymer. In certain embodiments, an insulative layer may surround the second conductor. The resistive layer may comprise one of a conductivity value and a resistivity value that was determined, in part, using a capacitance value and an inductance value of the cable. In certain embodiments, the resistive layer may comprise a bulk resistivity value of between about 1000 Ohms meters and 1 Ohm meter.

According to aspects of the present disclosure, a system for transmitting signals may comprise a signal source, a signal target, and a transmission cable coupled to the signal source and the signal target. The transmission cable may include a first conductor, a second conductor surrounding the first conductor, and a resistive layer between the first conductor and the second conductor that allows current flow between the first conductor and the second conductor. The first conductor, second conductor, and resistive layer may be arranged coaxially. The resistive layer may comprise at least one of a conductive rubber, a silicon compound, and a conductive polymer. In certain embodiments, the resistive layer comprises one of a conductivity value and a resistivity value that was determined, in part, using a capacitance value and an inductance value of the cable. The signal target may comprise a wellhead of a downhole drilling operation. The first conductor may be coupled to the signal source and the wellhead to transmit a control signal from the signal source to the wellhead.

According to aspects of the present disclosure, a method for transmitting signals may include coupling a transmission cable to a signal source and a signal target. The transmission cable may include a first conductor, a second conductor surrounding the first conductor, and a resistive layer between the first conductor and the second conductor that allows current flow between the first conductor and the second conductor. The method may also include transmitting a control signal from the signal source through the first conductor. The first conductor, second conductor, and resistive layer may be arranged coaxially. The resistive layer may comprise at least one of a conductive rubber, a silicon compound, and a conductive polymer. In certain embodiments, coupling the transmission cable to the signal target comprises coupling the transmission cable to a wellhead of a subterranean drilling operation. The method may further include receiving the control signal at a downhole tool disposed within a borehole of the subterranean drilling operation. In certain embodiments, the method may include conducting current from the first conductor to the second conductor when the transmission cable breaks, which may comprise conducting current through the resistive layer, the resistive layer dissipating energy from the current. The resistive layer may comprise a bulk resistivity value of between about 1000 Ohm meters and 1 Ohm meter.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A transmission cable, comprising:
- a first conductor coupled between a signal source and a signal target, wherein a control signal is transmitted from the signal source through the first conductor;
- a second conductor surrounding the first conductor, wherein a current is conducted from the first conductor to the second conductor when the transmission cable breaks; and
- a resistive layer between the first conductor and the second conductor that allows current flow between the first conductor and the second conductor.

2. The transmission cable of claim 1, wherein the first conductor, second conductor, and resistive layer are arranged coaxially.

3. The transmission cable of claim 1, wherein the resistive layer comprises at least one of a conductive rubber, a silicon compound, and a conductive polymer.

4. The transmission cable of claim 2, further comprising an insulative layer surrounding the second conductor.

5. The transmission cable of claim 1, wherein the resistive layer comprises one of a conductivity value and a resistivity value that was determined, in part, using a capacitance value and an inductance value of the cable.

6. The transmission cable of claim 1, wherein the resistive layer comprises a bulk resistivity value between about 1000 Ohm meters and 1 Ohm meter.

7. A system for transmitting signals, comprising:
- a signal source;
- a signal target; and
- a transmission cable coupled to the signal source and the signal target, the transmission cable comprising
  - a first conductor;
  - a second conductor surrounding the first conductor, wherein a current is conducted from the first conductor to the second conductor when the transmission cable breaks; and
  - a resistive layer between the first conductor and the second conductor that allows current flow between the first conductor and the second conductor.

8. The system of claim 7, wherein the first conductor, second conductor, and resistive layer are arranged coaxially.

9. The system of claim 7, wherein the resistive layer comprises at least one of a conductive rubber, a silicon compound, and a conductive polymer.

10. The system of claim 7, wherein the resistive layer comprises one of a conductivity value and a resistivity value that was determined, in part, using a capacitance value and an inductance value of the cable.

11. The system of claim 10, wherein the signal target comprises a wellhead of a downhole drilling operation.

12. The system of claim 11, wherein the first conductor is coupled to the signal source and the wellhead to transmit a control signal from the signal source to the wellhead.

13. A method for transmitting signals, comprising:
- coupling a transmission cable to a signal source and a signal target, wherein the transmission cable comprises
  - a first conductor;
  - a second conductor surrounding the first conductor, wherein a current is transmitted from the first conductor to the second conductor when the transmission cable breaks; and
  - a resistive layer between the first conductor and the second conductor that allows current flow between the first conductor and the second conductor; and
- transmitting a control signal from the signal source through the first conductor.

14. The method of claim 13, wherein the first conductor, second conductor, and resistive layer are arranged coaxially.

15. The method of claim 13, wherein the resistive layer comprises at least one of a conductive rubber, a silicon compound, and a conductive polymer.

16. The method of claim 13, wherein coupling the transmission cable to the signal target comprises coupling the transmission cable to a wellhead of a subterranean drilling operation.

17. The method of claim 16, further comprising receiving the control signal at a downhole tool disposed within a borehole of the subterranean drilling operation.

18. The method of claim 13, wherein transmitting current from the first conductor to the second conductor when the transmission cable breaks comprises conducting current through the resistive layer, the resistive layer dissipating energy from the current.

19. The method of claim 13, wherein the resistive layer comprises a bulk resistivity value between about 1000 Ohm meters and 1 Ohm meter.

* * * * *